(12) United States Patent
Magee

(10) Patent No.: US 10,167,055 B2
(45) Date of Patent: Jan. 1, 2019

(54) VARIABLY EXPANDING CHAIN TRANSMISSION

(71) Applicant: Joseph M. Magee, Spring, TX (US)

(72) Inventor: Joseph M. Magee, Spring, TX (US)

( * ) Notice: Subject to any disclaimer, the term of this patent is extended or adjusted under 35 U.S.C. 154(b) by 490 days.

(21) Appl. No.: 14/921,829

(22) Filed: Oct. 23, 2015

(65) Prior Publication Data
US 2016/0114858 A1 Apr. 28, 2016

Related U.S. Application Data

(60) Provisional application No. 62/069,051, filed on Oct. 27, 2014.

(51) Int. Cl.
| | |
|---|---|
| *F16H 9/02* | (2006.01) |
| *F16H 59/00* | (2006.01) |
| *F16H 61/00* | (2006.01) |
| *F16H 63/00* | (2006.01) |
| *B62M 9/08* | (2006.01) |
| *B62M 25/08* | (2006.01) |

(52) U.S. Cl.
CPC ............. *B62M 9/08* (2013.01); *B62M 25/08* (2013.01)

(58) Field of Classification Search
CPC .. B62M 9/08; F16H 55/54; F16H 9/10; F16H 2007/0891; F16H 55/30
USPC ........................................................ 474/49
See application file for complete search history.

(56) References Cited

U.S. PATENT DOCUMENTS

| | | | |
|---|---|---|---|
| 593,285 A | 11/1897 | Van Eyck | |
| 1,144,381 A | 6/1915 | Reimers | |
| 3,798,989 A * | 3/1974 | Hunt | B62M 9/08 280/237 |
| 4,030,373 A * | 6/1977 | Leonard | B62M 9/08 474/49 |
| 4,167,124 A * | 9/1979 | Zvetkov | F16H 9/24 474/53 |
| 4,260,386 A | 4/1981 | Frohardt | |
| 4,516,960 A | 5/1985 | Rathert | |
| 4,634,406 A * | 1/1987 | Hufschmid | B62M 9/08 474/49 |
| 4,642,070 A * | 2/1987 | Walker | B62M 9/08 474/49 |
| 4,696,662 A * | 9/1987 | Gummeringer | F16H 55/54 474/49 |

(Continued)

FOREIGN PATENT DOCUMENTS

| | | |
|---|---|---|
| DE | 102010019045 A1 | 11/2011 |
| WO | 2013013270 A1 | 1/2013 |

*Primary Examiner* — Henry Y Liu
(74) *Attorney, Agent, or Firm* — The Juhasz Law Firm

(57) ABSTRACT

A bicycle transmission allows a bicycle operator to change the radius of a pedal crank's transmission gear as sliding gear segments, radially arranged on a base ring assembly, vary their relative radial position from the center of the base plate. These gear segments slide in and out to change the effective radius of the gear. Spring biased locking pins engage adjustable control plates as the crank rotates. The locking pins release to make further adjustments to increase or decrease the effective radius. The transmission may also be used as a variable-ratio prime mover for other motive power applications, to transfer power from the wheel to another rotating component. The transfer of power may be via a chain or a belt.

18 Claims, 9 Drawing Sheets

(56) References Cited

U.S. PATENT DOCUMENTS

| | | | | | |
|---|---|---|---|---|---|
| 4,740,190 | A | * | 4/1988 | Pike | B62M 9/08 474/49 |
| 4,772,250 | A | * | 9/1988 | Kovar | B62M 9/08 474/47 |
| 4,832,660 | A | * | 5/1989 | Leonard | B62M 9/08 474/49 |
| 4,925,433 | A | * | 5/1990 | Brown | F16H 55/54 474/100 |
| 4,973,289 | A | * | 11/1990 | Leonard | B62M 9/08 474/136 |
| 5,104,357 | A | * | 4/1992 | Leonard | F16H 55/54 474/49 |
| 5,476,422 | A | * | 12/1995 | Schendel | B62M 9/08 474/49 |
| 5,772,546 | A | * | 6/1998 | Warszewski | B62M 9/08 474/50 |
| 5,984,814 | A | * | 11/1999 | Davenport | B62M 9/08 474/50 |
| 6,183,385 | B1 | * | 2/2001 | Bakulich, Jr. | F16H 9/10 474/49 |
| 6,332,852 | B1 | * | 12/2001 | Allard | B62M 9/08 474/49 |

\* cited by examiner

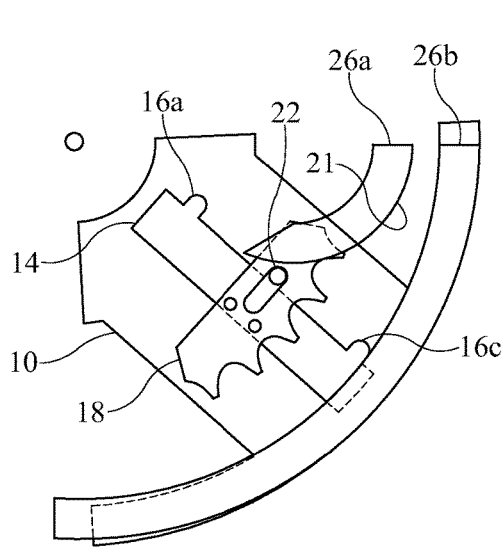 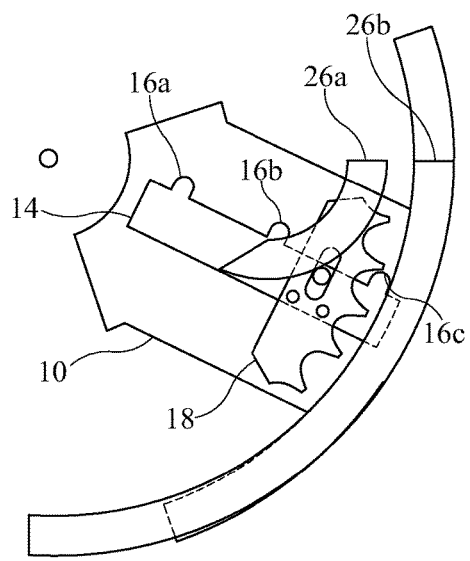
FIG. 3A    FIG. 3B
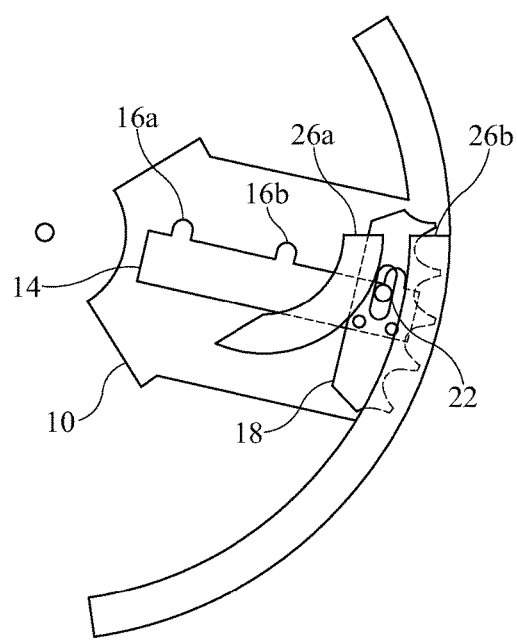 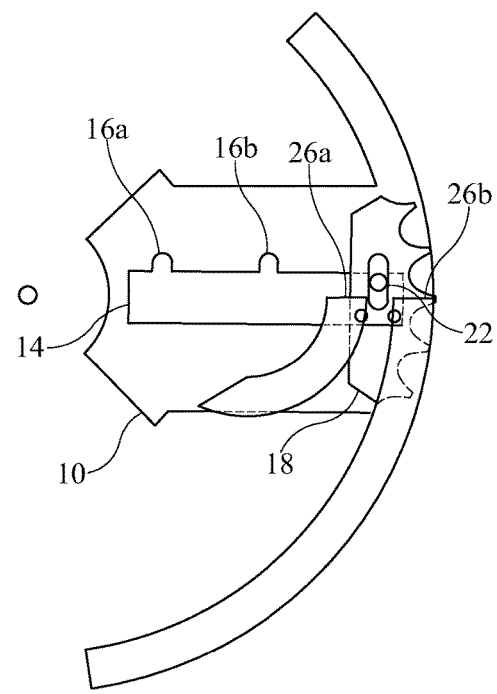
FIG. 3C    FIG. 3D

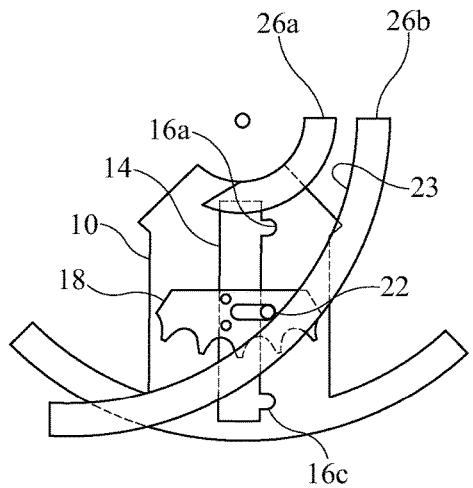
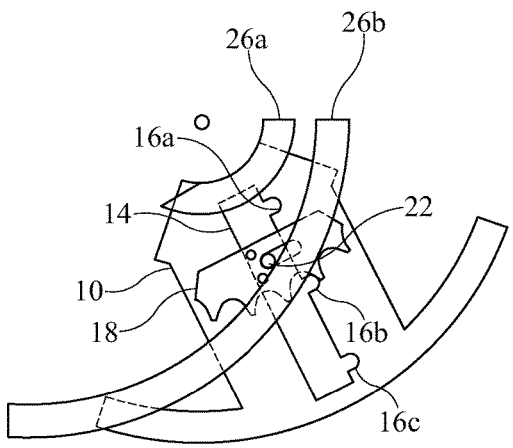
FIG. 4A             FIG. 4B
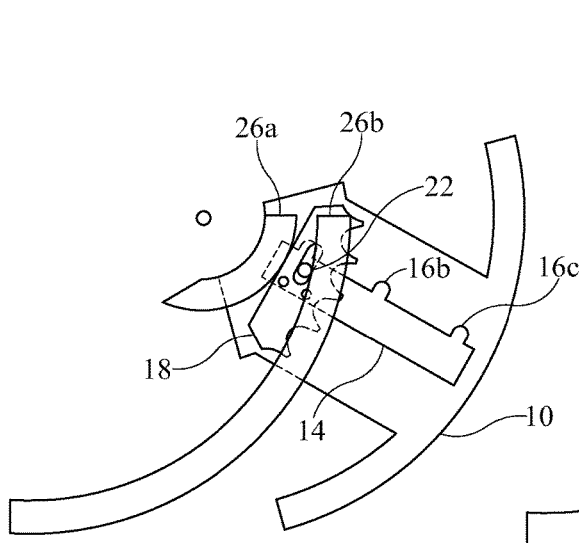
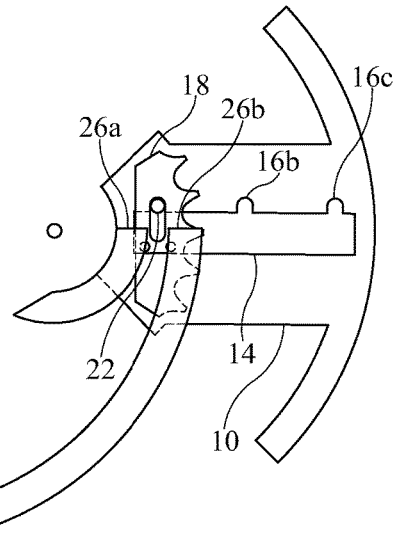
FIG. 4C             FIG. 4D

VARIABLY EXPANDING CHAIN TRANSMISSION

CROSS-REFERENCE TO RELATED APPLICATIONS

This application claims the benefit of U.S. Provisional Appl. 62/069,051, filed Oct. 27, 2014, which is hereby incorporated by reference in its entirety.

FIELD OF THE DISCLOSURE

This disclosure relates to a variably expanding driving sprocket for a bicycle transmission assembly.

BACKGROUND

Bicycles transmissions are used to transmit power applied to pedal cranks to the drive wheel. The pedal crank is typically located between the front and rear wheels, and may transmit power via a chain linked to the rear wheel and the pedal crank. There are typically two chain rings that a chain rides on. A first is by the pedal and a second on the rear wheel. Gear ratios between the pedal and the rear wheel gears are typically used to convert the speed and torque applied to the pedal to the wheel rotation. The gear by the pedal crank may also include a plurality of chain-rings and a front derailleur is used to move the chain across this plurality of chain-rings. It is also desirable to have smooth and continuous shifting between the plurality of chain-rings by the pedal crank. The rear wheel may further comprise a plurality of gears to create additional gear ratios for the bicycle. A gear shifter is typically used to move the chain across the plurality of gears on the wheel in order to set a desired gear ratio with the gear by the pedal. The desired gear ratio defines the two chain rings that the chain rides on.

In operating the bike, it is desirable that there be a smooth and continuous shifting between the plurality of gears on the wheel and the gear by the pedal in order to create the different gear ratios desired for a given ride. Sometimes, the smooth and continuous shifting may be hampered by gears that won't shift up or down in response to the gear shifter, by chain slipping or jumping or by shifting of the gears causing the chain to fall off.

In many of these applications, circular chain rings of various discrete radii are mounted on the pedal crank of the bicycle. Normally, circular chain-rings of various discrete radii are used on bicycles to achieve the effect of varying power transfer, but this method has the disadvantage of requiring the use of a gear derailleur, which rubs against the drive chain to change the chain's engagement on different chain-rings. Moreover, this change of chain-rings interrupts the power transfer, or at least makes the change abrupt, and can cause the chain to come off of the sprockets altogether. There is a need, therefore, to create a bicycle transmission which can change the radius of its gear sprockets in a continuous manner without creating friction on the drive chain while ensuring that the chain continues to be engaged throughout gear changes.

The major problem in implementing a transmission gear that can vary its radius is that as the radius increases, so does the circumference. Likewise, the distance between the teeth of the sprocket by which it is driven by the power train would also increase, yet the distance between the links of the drive chain which the teeth of the sprocket must engage does not, and cannot, increase if it is to effectively transfer power from the pedals and its sprocket. These difficulties may be overcome if the gear were broken into parts, so that the effect of continuously changeable gears was created by sliding the gear segments out from the center of the pedal crank's rotation.

Some prior attempts at solving these problems have sought to use gear segments to increase the radius of the sprocket, but these have involved complex mechanism to change the positions of these segments. U.S. Pat. No. 593,285 to Van Eyck in 1897 and U.S. Pat. No. 3,798,989 to Hunt in 1974 used gear segments actuated by springs and levers. U.S. Pat. No. 4,260,386 to Frohardt in 1981, U.S. Pat. No. 4,642,070 to Walker in 1987, and U.S. Pat. No. 4,772,250 to Kovar, et al. in 1988, attempted simultaneous displacement of gear segments through the actuation of a central cog and a series of springs, or an independent control disk. U.S. Pat. No. 5,772,546 to Warszewski in 1998 used the tension in the drive chain to vary the position of gear segments.

Other attempted solutions have used radially arranged bolts or screws to vary the radius of the element that engages a chain or belt in the transfer of power, but most have done so by expanding the whole circumference simultaneously. As mentioned above, simultaneous expansion of the circumference entails widening the space between the transmission elements which engage the drive chain or belt. U.S. Pat. No. 1,144,381 to Reimers in 1915, U.S. Pat. No. 4,167,124 to Zvetkov et al. in 1979, U.S. Pat. No. 4,696,662 to Gummeringer in 1987 and U.S. Pat. No. 4,740,190 to Pike in 1988 all attempted simultaneous expansion through radially arranged bolts actuated by a central beveled gear. U.S. Pat. Ser. No. 6,183,385 to Bakulich 2001 attempted the same sort of expansion either through a single electrical motor driving an independent control disk, or through a series of synchronized motors driving each bolt.

U.S. Pat. Ser. No. 5,476,422 to Schendel in 1995 attempted to effect the displacement of chain engaging elements along radially arranged bolts through the successive rotation of wheels located at the periphery of his device which drove the bolts. U.S. Pat. Ser. No. 5,984,814 to Davenport in 1999 employed movement of chain engaging sectors along radially arranged arms relying on springs to bias their motion outward, and braking a spooling element to wind flexible elements to draw the sectors inward. U.S. Pat. No. 4,634,406 to Hufschmid in 1987 used pivotal prongs positioned next to a disc to vary the radial position of the several sprocket segments sliding within radially arranged slots, the segments being locked in the desired position by a spring biased pin. U.S. Pat. No. 4,516,960 to Rathert, also in 1987 used a fork-shaped adjusting member to vary the radial position of chain engaging drivers which lock in the desired position by means of force applied to wedge-shaped elements from the tension on the driving chain.

U.S. Pat. No. 6,332,852 to Allard in 2001 employed a spring-biased locking pin which pressed against a sloped plate to release the adjusting element to which was attached a chain-engaging gear segment to allow for the change its radial position; the locking pin then was pushed along an angled face of the sloped plate to actually change its radial position. The overall mechanism consisted of many more parts than the present disclosure, and friction produced by pressing the locking pin against the sloped plate with each rotation of the device makes it impractical. PCT Publ. WO2013013270 to Kaiser and Braur in 2013 disclosed disengagement of locking pins and adjustment to new radial positions by means of magnets, but this system is both unreliable and excessively heavy, as well as being more complicated than the present disclosure. German patent application DE 102010019045 A1 to Hettlage in 2011 used belt engaging elements sliding within radially arranged grooves, but the mechanism by which they were locked into position or released to allow adjustment consisted of at least six parts, and so is considerably more complicated than the present disclosure.

What is needed is a transmission which will smoothly and reliably transition from a lower mechanical advantage at a large radius to a higher mechanical advantage at a lower radius, or vice-versa, without complicated gearing mechanisms. The transmission should be easy to install on an existing mechanical device, such as a bicycle, without complicated adjustments or adaptations.

SUMMARY

One embodiment of this device allows a bicycle operator to change the radius of the pedal crank's transmission gear, varying the effective moment arm, and thereby varying the amount of power transferred through the power chain, to the rear wheel. This embodiment is arranged with sliding gear segments radially arranged on a base rotated by a bicycle crank. Gear segments slide to change the effective gear radius as spring-biased locking pins are released when engaged by movable and adjustable, non-rotating control plates.

Another embodiment of this disclosure is a transmission for a bicycle. The transmission includes a rigid base plate for rotating about a central axis of rotation, and a plurality of adjustment glide tracks attached between an outer portion of the rigid base plate and a central portion of the rigid base plate. Each of the plurality of adjustment glide tracks includes at least two locking notches, and a plurality of gear segments. Each one of the plurality of gear segments has a plurality of teeth for engaging a drive chain, is attached to said rigid base plate to allow said plurality of gear segments to slide radially inward and outward along one of the plurality of adjustment glide tracks, and includes a sliding pin for engaging one of the gear segments within one of the plurality of adjustment glide tracks via one of the locking notches. The transmission also includes a non-rotating control guide for engaging a sliding pin of each of the plurality of gear segments within one of the plurality of adjustment glide tracks and a control cable for movement of the non-rotating control guide by an operator of the bicycle. The operation of the control cable moves the non-rotating control guide backward or forward for engaging a sliding pin of each of the plurality gear segments, moving each of the plurality of gear segments in a direction toward the outer portion of the rigid base plate or toward the central portion of the base plate and changing an effective radius of a curved path formed by the plurality of gear segments.

Another embodiment of this disclosure is a transmission for a bicycle. The transmission includes a wheel, a plurality of spokes attached between a periphery of the wheel and a central portion of the wheel, each of the plurality of spokes including at least two locking notches, and a plurality of gear segments. Each one of the plurality of gear segments has a plurality of teeth, is attached to one of the plurality of spokes to allow each one of the plurality of gear segments to slide radially inward and outward along the one of the plurality of spokes, and includes a sliding pin for engaging one of the plurality of spokes via one of the at least two locking notches. The transmission also includes a control guide for engaging a sliding pin of each of the plurality of gear segments and a control mechanism for movement of the control guide. The operation of the control mechanism moves the control guide backward or forward for engaging a sliding pin of each of the plurality of gear segments, moving each of the plurality of gear segments in a direction toward the periphery of the wheel or toward the central portion of the wheel, and changing an effective radius of a curved path formed by the plurality of gear segments.

There are other embodiments of the disclosure, of which the present examples are only a few of the embodiments that are possible.

BRIEF DESCRIPTION OF THE DRAWINGS

FIGS. 3A-3D are detailed side elevation views of one embodiment of the bicycle transmission showing the operation of the device as a control plate engages the locking toggle and moves the gear segment toward the periphery of the base plate.

FIGS. 4A-4D are detailed side elevation views of one embodiment of the bicycle transmission showing the operation of the device as a control plate engages the locking toggle and moves the gear segment toward the center of the base plate.

DRAWINGS—REFERENCE NUMERALS

Figure 1A:
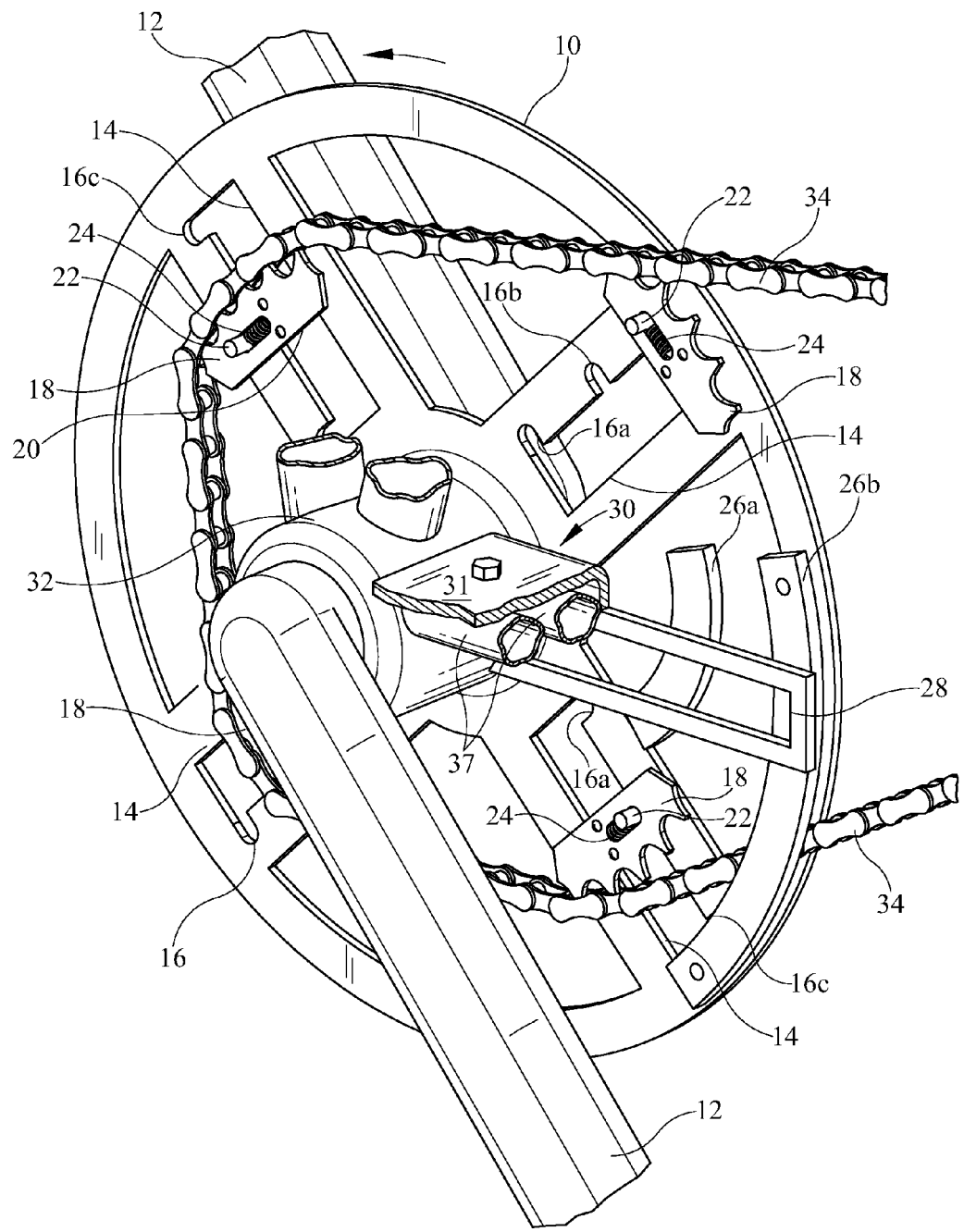
FIG. 1A is a perspective view of one embodiment of the bicycle transmission.

| Reference numeral | Description |
| --- | --- |
| 10 | Base plate |
| 12 | Pedal crank |
| 14 | Adjustment glide track |
| 14a, 14b | Opposed glide track sides |
| 16 a, b, c | Locking notches |
| 18 | Gear segment |
| 20 | Gear segment glide |
| 21 | Inner surface |
| 22 | Locking toggle |
| 23 | Outer surface |
| 24 | Toggle spring |
| 25 | Spring mount |
| 26a, 26a | Control plates |
| 27 | Support plate |
| 28 | Control guide |
| 30 | Control system mounting bracket |
| 31 | Control guide top |
| 32 | Bottom bracket |

-continued

| Reference numeral | Description |
| --- | --- |
| 33 | Guide pin |
| 34 | Drive chain |
| 35 | Slot |
| 36 | Control cable |
| 37 | Bicycle frame |
| 42 | Control guide slot |
| 44 | Control guide track |
| 50 | Control system |
| 51, 51a | Control top and slot |
| 52 | Power supply |
| 53 | Microprocessor |
| 54 | Radio receiver |
| 55 | Motor/actuator |
| 56 | Linkage |
| 57 | Control guide |
| 58a, 58b | Control plates |
| 59 | Bicycle frame |
| 60 | Gear segment with scissoring mechanism |
| 61 | spoke |
| 62 | Toothed edge |
| 63 | Riding cuff |
| 64 | Scissoring mechanism |
| 65 | Locking toggle pin |
| 66 | Pin extension |
| 67 | Opening |
| 70 | L-shaped mechanism |
| 71 | Spoke with orifices |
| 72 | Orifices |
| 73 | Gear segment |
| 74 | Riding cuff |
| 75 | Pivot |
| 76 | L-shaped toggle |
| 77 | spring |
| 78 | Locking toggle pin |
| 80 | L-shaped mechanism with notched spoke |
| 81 | Notched spoke |
| 82 | Notches |
| 83 | Gear segment |
| 84 | Cuff |
| 85 | Opening |
| 86 | L-shaped toggle |
| 87 | Pivot |
| 88 | Spring |
| 89 | Engagement portion |

DETAILED DESCRIPTION OF THE DISCLOSURE

Broadly speaking, this disclosure is directed to a transmission for a bicycle. The transmission allows a bicycle operator to change the radius of the pedal crank's transmission gear, varying the effective moment arm, and thereby varying the amount of power transferred through the power chain to the rear wheel. In one embodiment, sliding gear segments are radially arranged on a base rotated by a bicycle crank. Gear segments slide in and out from the center of the base plate to change the effective radius of the gear as spring-biased locking pins are released when engaged by movable and adjustable, non-rotating control plates. The spring-biased locking pins then move up and down and re-engage in a different location, allowing a different effective radius of the gear.

In one example, the disclosure is directed to a transmission for a bicycle. The transmission includes a rigid base plate for rotating about a central axis of rotation, and a plurality of adjustment glide tracks attached between an outer portion of the rigid base plate and a central portion of the rigid base plate. Each of the plurality of adjustment glide tracks includes at least two locking notches and one gear segment. Each one of the plurality of gear segments has a plurality of teeth for engaging a drive chain, is attached to said rigid base plate to allow said plurality of gear segments to slide radially inward and outward along one of the plurality of adjustment glide tracks, and includes a sliding pin for engaging one of the gear segments within the one of the plurality of adjustment glide tracks via one of the locking notches. The transmission also includes a non-rotating control guide for engaging a sliding pin of each of the plurality of gear segments within one of the plurality of adjustment glide tracks and a control cable for movement of the non-rotating control guide by an operator of the bicycle. The operation of the control cable moves the non-rotating control guide backward or forward for engaging a sliding pin of each of the plurality gear segments, moving each of the plurality of gear segments in a direction toward the outer portion of the rigid base plate or toward the central portion of the base plate and changing an effective radius of a curved path formed by the plurality of gear segments.

Figure 1B:
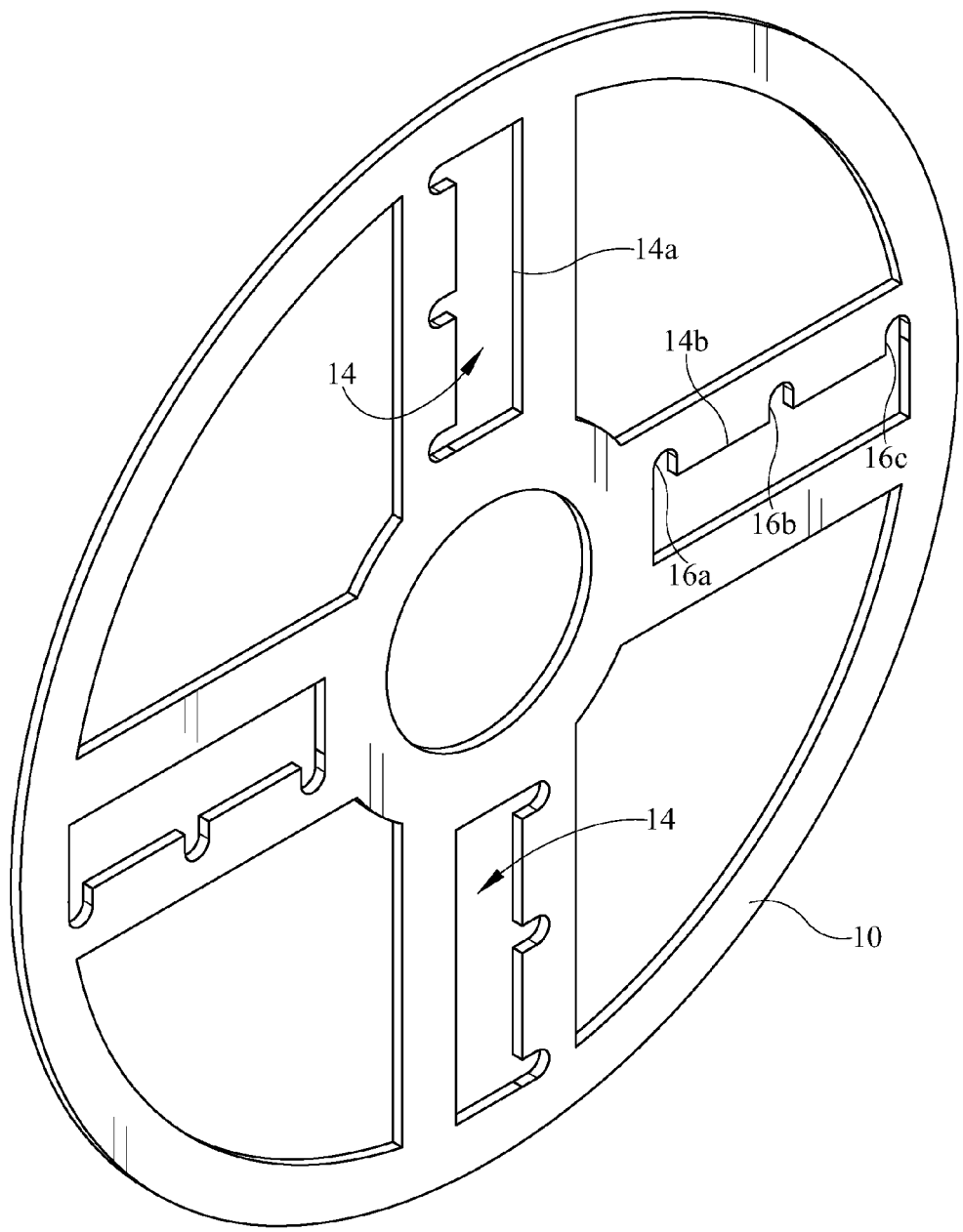
FIG. 1B is a separate perspective view of one component of the transmission, the base plate.

As depicted in FIG. 1A, one illustrative embodiment of a transmission device according to this disclosure comprises a base plate 10 made of a rigid material such as metal, plastic or other suitably rigid substance. The base plate defines a bottom bracket 32 in its center which allows the transmission device to attach a pair of bicycle pedal cranks 12, which is shown in FIG. 1A. The base plate also defines a plurality of adjustment glide tracks 14 that extend radially outward from the bottom bracket. Each adjustment glide track has a smooth first side 14a and an opposed second side 14b with several locking notches 16 placed intervals on the second side opposite the first side, the locking notches 16 extending from near the bottom bracket 32 radially outward toward the outer perimeter of the base plate 10. Base plate 10 is shown separately in greater detail in FIG. 1B, showing the locking notches of glide tracks 14, sides 14a, 14b and locking notches 16a, 16b, 16c.

A gear segment 18 likewise made of a suitably rigid material is attached to the base plate 10 by means of a gear segment glide 20 fitting into each adjustment glide track 14 and which slides along the length of each adjustment glide track 14 from the center of the base plate 10 to its periphery. The areas surrounding the adjustment glide tracks may be thought of as spokes of a wheel, the spokes approximating a radius of the base plate.

A sliding locking toggle 22 is made of a suitably rigid material such as metal, plastic or other suitably rigid substance and comprises a cylindrical shaped pin protruding perpendicularly to the plane of the base plate 10 starting from the posterior side of the gear segment, extending through each gear segment 18, and extending outwardly a short distance above the anterior side of the gear segment. The locking toggle 22 is biased into the locking notch 16 inside the adjustment glide track by a compression toggle spring 24 within the gear segment 18.

Near the base plate 10 is a pair of arcuately shaped control plates 26a, 26b made of a rigid material such as metal, plastic or other suitably rigid substance between which the locking toggle 22 of each gear segment 18 passes when the base plate is rotating in the the direction of the arrow at top, counter-clockwise, and the locking toggle is engaged in a single locking notch 16a, 16b, 16c. Illustratively, the radius of curvature of control plate 26b is the radius of curvature of base plate 10 and the control plate 26a has a smaller radius of curvature. Other radius of curvatures may be used for the control plates 26a, 26b to accomplish the functions of the control plates described in this disclosure. Control plates 26a, 26b are fixedly attached to control guide 28 which is slideably received by a support plate 30 which is attached to a frame 37 of the bicycle. The control plates 26 move radially along the support plate 30 as a coupled pair in a path parallel to the plane of the base plate 10 by sliding with control guide 28 along the support plate under the control of a gear selector depicted in FIG. 2A.

Figure 2A:
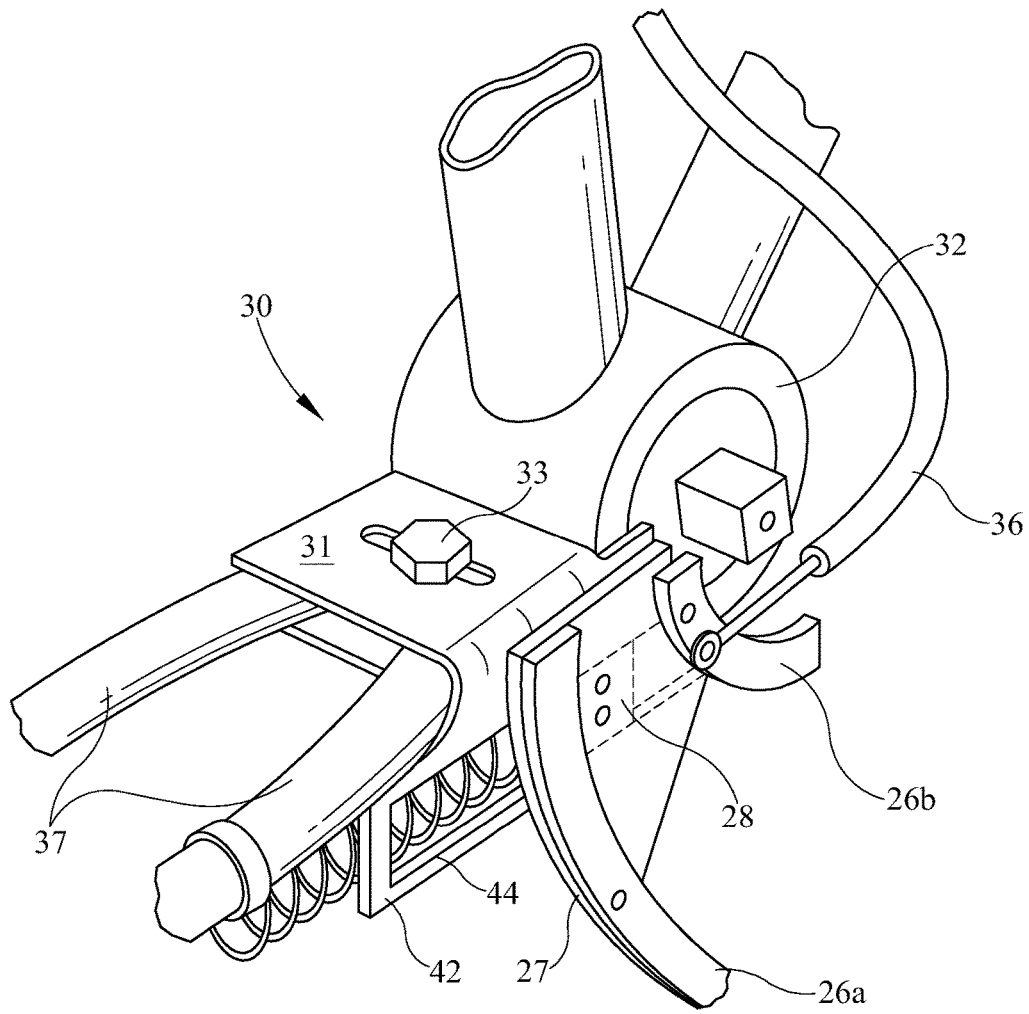
FIG. 2A is a perspective view of one embodiment of the control system, for the transmission, including a control guide and control plates.

FIG. 2A discloses an additional view of the control system 30 mounting bracket by which a user controls the variably expanding chain transmission of this disclosure. FIG. 2A is a perspective view, in which the control plates 26a, 26b are illustratively positioned next to the base plate 10 (see FIG. 1A) behind the bicycle's bottom bracket 32 so as to engage the locking toggles 22 (also shown in FIG. 1A) in the arc of their motion when their gear segments 18 are not engaging the bicycle's drive chain 34. The control plates 26a, 26b are attached to a moveable support plate 27 which is attached to the control guide 28. The control plates 26a, 26b are moved back and forth on the support plate 27 and control guide 28 by means of a control cable 36 attached to the control plates 26. The control cable is moved by the user with a suitably adjustable gear shifter device (not shown) under the bicycle operator's control.

In this view, the control system mounting bracket 30 includes a top 31 portion with a slot or opening that allows a mounting pin 33 to lock the bracket in place with respect to the bicycle frame 37 and bottom bracket 32. This holds the control system securely in place. The control cable 36 mounts to control plate 26a. Both control plates 26a, 26b are mounted to a support plate 27, which is secured to the control guide 28.

Figure 2B:
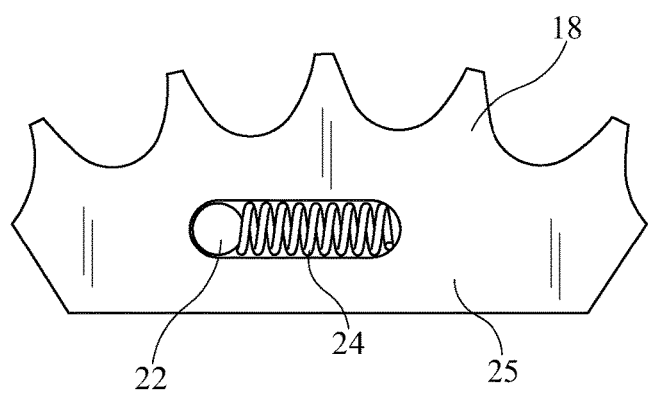
FIG. 2B depicts additional details of examples of the gear segments.

Control guide 28 slides back and forth on track 44 with opening 42 of the control system mounting bracket. FIG. 2B depicts additional details of the gear segment 18, FIG. 2B depicting the rear portion. Gear segment 18 includes a spring 24, such as a helical torsion spring, mounting between spring mount 25 on one side of the orifice, as shown and a locking toggle or toggle pin 22 on the other side. The spring allows the gear segment to engage and disengage via the toggle when the user wishes to adjust the transmission by moving the control plates.

As shown in FIG. 3A, as the pedal crank 12 to which the base plate 10 is attached rotates in the direction of the arrow at top, counterclockwise (see FIG. 1A), the bicycle operator may cause the control cable 36 (shown in FIG. 2) to extend and move the control plates 26a, 26b toward the rear of the bicycle to cause the control plates to move toward the outside of the base plate 10. As the movement continues, an outer side 21 of the inner control plate 26a makes contact with each locking toggle 22 as it moves towards the outside of the base plate. This contact advantageously causes the locking toggle 22 to disengage from and to steer clear of notches 16a, 16b, 16c as the control plate 26a slides the locking toggle 22 along the hole of the gear segment 18 to which it is attached towards the outside of the base plate.

As depicted in FIGS. 3B, 3C, the outer side 21 of the inner control plate 26a in contact with locking toggle 22, causes the gear segment 18 to slide its gear segment glide 20 along its adjustment glide track 14 toward the periphery of the base plate 10. The gear segment 18 continues to slide outward as the pedal crank 12 turns until the locking toggle 22 reaches the edge of the inner control plate 26a as seen in FIG. 3D. There, once the locking toggle 22 has moved free of the inner control plate 26a, the locking toggle 22 ceases to be pressed away from the notches by inner control plate 26a and by the force of toggle spring 24 (shown in FIG. 1A), the locking toggle 22 is biased again into its locked position inside the outermost notch 16c in this example. This example illustrates how toggle 22 is moved from an inner notch 16a shown in FIG. 3A to an outermost notch 16c shown in FIG. 3D all under the action of the inner control plate 26a which advantageously guides toggle 22 throughout this operation as previously described. The outer control plate 26b advantageously provides a terminal point beyond which the locking toggle can move no more and as a guide for directing the locking toggle into the notch under the influence of the spring.

FIGS. 3A-3B depict the operation of this disclosure in moving the locking toggle 22 from any notch that is radially closer to the pedal 12 to any other notch that is radially farther from the pedal 12. For example, the transmission device of this disclosure may move the locking toggle 22 from a notch 16a to a notch 16b. These notches are both readily seen in FIGS. 3C and 3D. Alternatively, the transmission device of this disclosure may move the locking toggle 22 from notch 16b to notch 16c. Notches 16b and 16c are readily seen in FIGS. 3C and 3A, respectively. In the foregoing example, This process of pressing the locking toggle 22 to slide free of, that is, to disengage from the locking notch 16, sliding the gear segment 18 to a different locking notch, and re-engaging the locking toggle 22 into the different locking notch is repeated for each of the four gear segments 18 depicted in FIG. 1A as each gear segment 18 with a gear segment glide 20 within an adjustment glide track 14 is rotated with the pedal crank 12 until all of the gear segments 18 have been moved to the desired radial position. This motion of the gear segment 18 along the adjustment glide track 14 toward the periphery of the base plate 10 will have increased the effective radius of the transmission gear by increasing the distance from the center of the base plate 10 to the point at which the gear segment 18 makes contact with the drive chain 34. The amount of power transferred to the drive chain 34 with the subsequent turn of the pedal crank 12 will have thus increased.

Moving the control plates 26a, 26b in the opposite direction achieves the opposite result, namely the decrease in effective radius of the transmission gear, with a resulting decrease in power transferred to the drive chain 34. As depicted in FIG. 4A, as the pedal crank 12 to which the base plate 10 is attached rotates in the direction of the arrow at top, counter-clockwist, the bicycle operator may cause the control cable 36 to retract by operation of the gear shifter (not shown) and move the control plates 26a, 26b toward the front of the bicycle to cause the control plates to move toward the inside of the base plate 10. Unlike in the operation shown in FIGS. 3A-D where control plate 26a provides the control surface for disengaging and moving the locking toggle radially outward, in FIGS. 4A-D, it is an inside curved surface 23 of the outside control plate 26b that makes contact with each locking toggle 22 as it passes the control plates 26. This contact causes the sliding of the locking toggle 22 within the hole of the gear segment 18 to which it is attached. By this contact, the locking toggle 22 slides free, that is, disengages, from its locking notch 16. The inside curved surface 23 of the outer control plate 26b, once causing locking toggle 22 to disengage, then causes the locking toggle to slide with its gear segment glide 20 along its adjustment glide track 14 toward the center of the base plate 10 as depicted in FIGS. 4B-4C. The gear segment 18 continues to slide inward as the pedal crank 12 turns until the locking toggle 22 reaches the edge of the outside control plate 26b as depicted in FIG. 4D.

When the locking toggle 22 has moved free of the outside control plate 26b, the locking toggle 22 ceases to be biased away from the notches by control plate 26a and becomes biased into the notch by the force of toggle spring 24. In this way, the locking toggle 22 slides from one locked position to another locked position after sliding along the adjustment glide track 14 as previously described. This process of pressing the locking toggle 22 to slide free the locking notch 16, sliding the gear segment 18 and re-engaging the locking toggle 22 in a different locking notch 16 is repeated as each gear segment 18 with a gear segment glide 20 within an adjustment glide track 14 is rotated with the pedal crank 12 until all of the gear segments 18 have been moved to the desired radial position.

This motion of the gear segment 18 along the adjustment glide track 14 toward the center of the base plate 10 will have decreased the effective radius of the transmission gear by decreasing the distance from the center of the base plate 10 to the point at which the gear segment 18 makes contact with the drive chain 34. The amount of power transferred to the drive chain 34 with the subsequent turn of the pedal crank 12 will have thus decreased.

The foregoing example illustrates how the chain ring of the pedal that a chain rides on is modified according to this disclosure so that the speed and torque applied to the pedals are smoothly translated to a lower gear ratio with the gears on the wheel as in the foregoing example or into a higher gear ratio as described below. The gear selector of this disclosure may thus move the chain across a variety of gears provided on the chain ring of the pedal as well as moving the chain across the plurality of gears on the wheel in order to smoothly set a desired gear ratio with the gear by the pedal by the operation of the gear selector as herein disclosed.

The disclosure overcomes the disadvantages of the standard discrete-sized sprocket transmission by varying the effective radius of the transmission gear without an accompanying increase in the distance between the teeth of the gear which are being driven by the power chain at the time. It is able to accomplish both feats by making use of sliding gear segments, toothed circle arcs with which the power chain makes contact. As the gear segments slide outward from the center toward the periphery of the device, the distance from the center of the wheel to the point at which each makes contact with the power chain is increased thus increasing the power transferred, but since the teeth of each gear segment are fixed, the distance between the teeth does not increase. The whole of the chain is not stretched since the gear segments slide outward and inward only when they are not in contact with the chain. The disclosure is able to achieve as many or more gear changes as standard multiple chain-ring transmissions with a significant reduction in weight.

The number of gear segments, as well as their size and the number of teeth engaging the power chain could vary in different embodiments. Gear segments could also slide along adjustment arms instead of within adjustment glide track in the base plate. The basic sliding gear segment design could also be replaced by pivoting gear segments of various shapes which pivot around one of their fixed ends as a pin slides in a groove along their length as the pin simultaneously slides radially in the manner of the present sliding gear segments.

The locking toggle of the first embodiment could be replaced with a pivoting L-shaped locking toggle, having the end of one if its arms attached to the posterior of the gear segment. This L-shaped locking toggle pivots by contact with the control plates to release a locking pin from locking notches in the edge of the adjustment glide track. The locking toggle of the first embodiment could be replaced with a scissoring locking mechanism, which is squeezed by contact with the control plates to release a locking pin from locking notches in the edge of the adjustment arms. The locking toggle of the first embodiment could also be replaced by a locking toggle which pivots in a plane parallel to the plane of the base plate to release a locking pin whenever its engagement pins make contact with the control plates. The locking toggle of the first embodiment could also be replaced by an L-shaped lever which pivots at its corner in a plane perpendicular to the plane of the base plate, and from the upper arm of which a locking pin would protrudes to fit into the locking notches on its adjustment arm. The lower arm of this locking toggle would extend as an engagement pin and make contact with the control plates. The locking toggle of the first embodiment could also be replaced by an L-shaped part with a locking pin protruding perpendicular to the plane of the base plate through a hole in the gear segment into a locking notch in its adjustment arm. The upper arm of the locking toggle extends parallel to the plane of the base plate as an engagement pin which makes contact with the control plates. By this contact, the pivoting of the locking toggle against the angled surface of a toggle guide raises the locking pin to release the locking pin from its locking notch.

Figure 5:
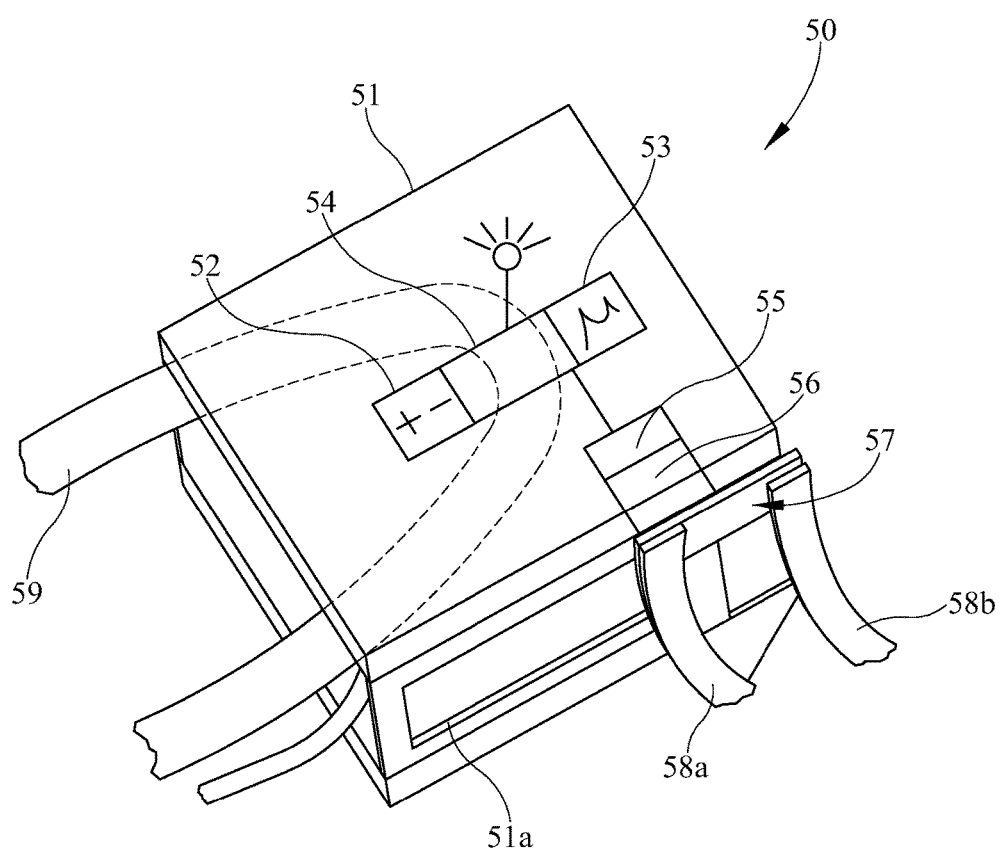
FIG. 5 depicts an additional embodiment of the control plate and a method for controlling the bicycle transmission.

The entire transmission could also be incorporated into the rear wheel of a bicycle, or indeed onto any machine which transfers power via a chain or belt. Displacement of the gear segments by means of control plates could be replaced with computer controlled motorized wheels or a gear-in-toothed-track mechanism for lower friction and/or precisely indexed gear changes. This is depicted in FIG. 5, which discloses a motorized control system 50 for the variably-expanding chain transmission. The control system 50 includes a control guide 51 mounted on a frame 59, such as a bicycle frame. The control plate mounts a power supply 52, such as a battery. The control system also includes a microprocessor 53 with a radio receiver 54 for receiving a control signal from an operator. The microprocessor 53 controls a motor 55 and any necessary linkage 56 for interfacing with the control guide 57. The control guide 57 operates as the control guide in other embodiments, to enlarge or decrease a radius of the transmission gear using control plates 58a, 58b along slide path or opening 51a.

Figure 6A:
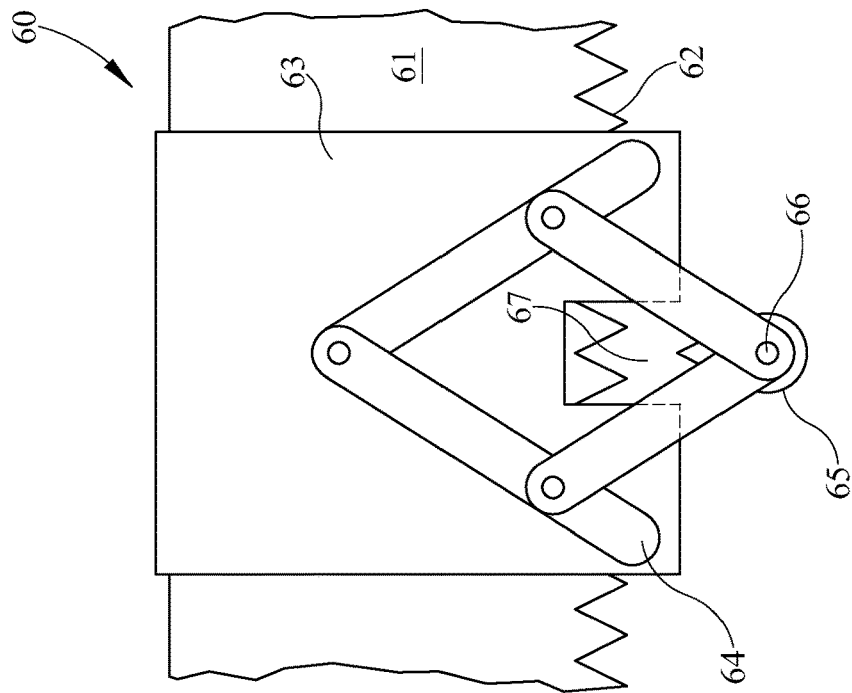
FIGS. 6A-6B depict an alternate mechanism for changing a radius of the gear segments and thus the effective moment arm for engaging the chain.
Figure 6B:
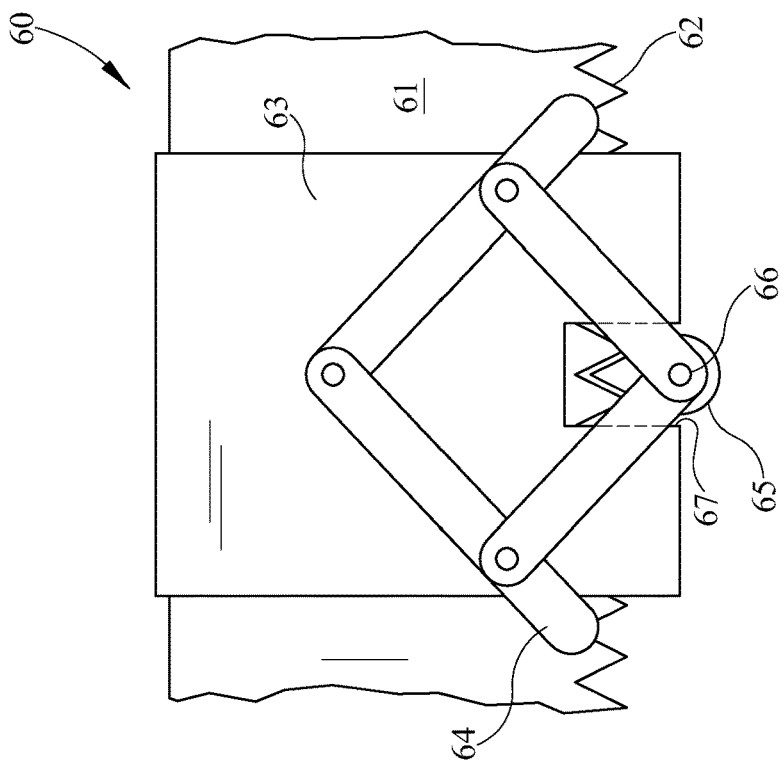
Figure 7:
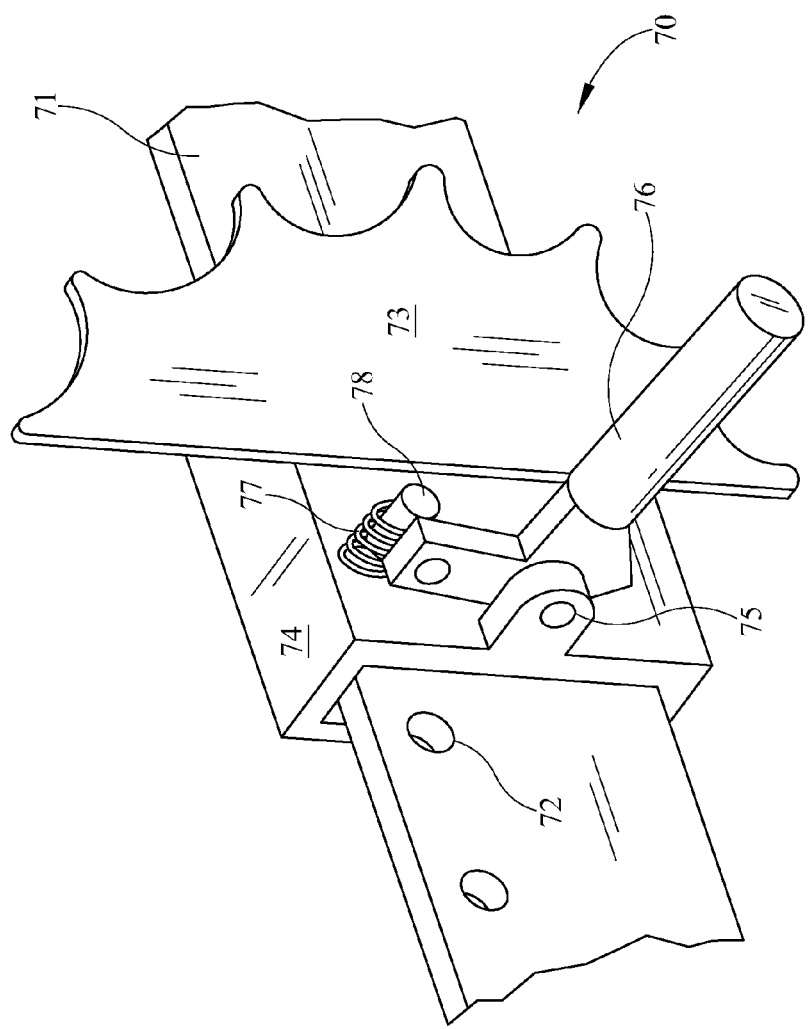
FIG. 7 depicts an additional alternate mechanism for adjusting the radius of the gear segments and thus the effective moment arm for engaging the chain.
Figure 8:
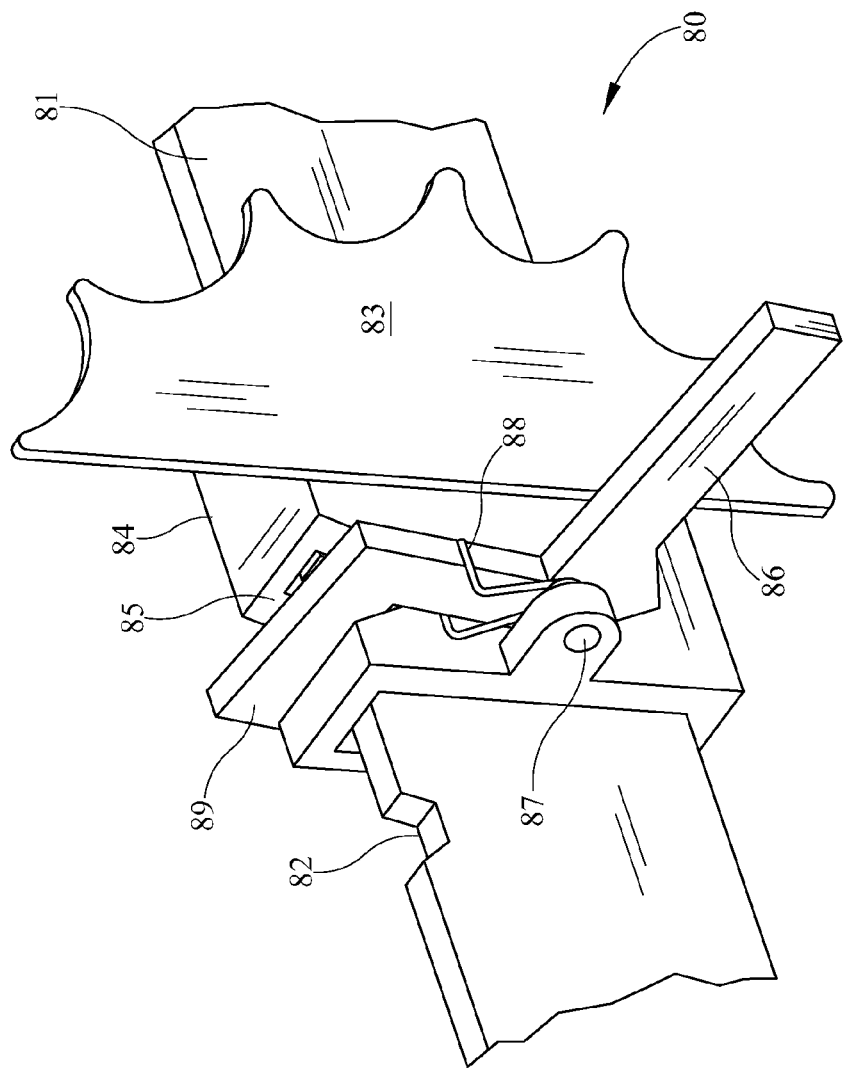
FIG. 8 depicts another mechanism for varying the radius of the gear segments and the effective moment arm for engaging the chain.

Additional examples of useful mechanisms are depicted in FIGS. 6-8, each of which depicts an alternate way to accomplish what is described and shown for the previous figures. In FIGS. 6A-6B, for example, mechanism 60 includes a spoke 61, which may be considered a thinner example of a glide track. Riding cuff 63 mounts a scissoring mechanism 64 for interfacing with a toothed edge 62 of spoke 61 through opening 67 of the riding cuff. A locking toggle pin 65, in the reverse shape of a tooth of the toothed edge, fits into the toothed edge to fix the positon of the scissoring mechanism 64 along the spoke. In FIG. 6A on the left, the mechanism rests in a fixed position, while FIG. 6B, on the right, depicts the scissoring mechanism 64 in transition, also depicting the toothed shape of the locking toggle pin 65. The pin extension 66, extending above the riding cuff, is positioned for interfacing with control plates, similar to control plates 26a, 26b described above for FIG. 1A. The gear segment for FIGS. 6A-6B is not shown to assist in clarity.

FIG. 7 depicts another suitable mechanism 70, which includes an L-shaped mechanism. Riding cuff 74 rides on spoke 71 with orifices 72. Cuff 74 mounts the gear segment 73 and also mounts a pivot 75 and L-shaped toggle 76. Control plates (not shown) similar to those in FIG. 1A, will interact with toggle 76 to release the mechanism and allow it to move left or right to increase or decrease the effective radius of the gear segment on the base plate (not shown). The L-shaped toggle 76 pivots on pivot 75, releasing or engaging locking toggle pin 78 into an orifice 72 and holding the riding cuff 74 and gear segment in place. Spring 77 biases locking toggle pin 78 into engagement with orifice 72 until the control plates engage the L-shaped portion 76, causing pivoting of the L-shaped portion 76 and releasing locking toggle pin 78, so that the cuff and the gear segment is able to move to a different position, as desired. Spring 77 ensures reliable engagement of locking toggle pin 78 in position as the device to which this mechanism is attached moves or otherwise operates.

Yet another mechanism is depicted in FIG. 8. In this example, a cuff mechanism 80 uses a notched spoke 81, with notch 82 depicted, to secure the position of the gear segment 83 along the notched spoke. Spoke 81 includes a plurality of notches 82 along one surface of the spoke, only one notch visible in this view. Gear segment 83 is attached to cuff 84 through opening 85 to accommodate a mechanism that locks the cuff 84 with respect to its position along notched spoke 81. The mechanism, an L-shaped toggle, includes the L-shaped portion 86, a pivot 87, biasing spring 88 and engagement portion 89. In operation, control plates (not shown) engage the L-shaped portion 86, pivoting the toggle and causing disengagement of engagement portion 89 from a notch 82 along the spoke and allowing the riding cuff and gear segment to move to a new position along the spoke. Spring 88 biases the engagement portion 89 into engagement with notch 82 of the spoke, so that the cuff and gear segment are steadily in position as the bicycle or other device, upon which the equipment is mounted, moves along or otherwise operates.

In view of this disclosure, it will be seen that an improved transmission for a bicycle or other device can help. The transmission may also be used as a prime mover for other objects, such as for moving goods on a conveyor belt, where it may be advantageous to have an easy start at one gear ratio followed by application of greater power at a different gear ratio after start-up, similar to start-up of a bicycle There are many embodiments of the present disclosure. In this disclosure, technologies are generally disclosed for these types of transmission or prime movers.

One example is a transmission that may be used for a bicycle. This disclosure may be used on any mechanical device that transfers power using a belt or a chain. Examples include motorcycles, three-or-four wheeled all-terrain vehicles, and pedal-driven three- or four-wheeled vehicles. The principles disclosed here could be applied to vary the size of the pulleys in conveying long continuous materials, such as in cloth, paper or film within a camera or a projector. Many other examples are possible.

The transmission includes a rigid base plate for rotating about a central axis of rotation, and a plurality of adjustment glide tracks attached between an outer portion of the rigid base plate and a central portion of the rigid base plate. Each of the plurality of adjustment glide tracks includes at least two locking notches, and a plurality of gear segments. Each one of the plurality of gear segments has a plurality of teeth for engaging a drive chain, is attached to said rigid base plate to allow said plurality of gear segments to slide radially inward and outward along one of the plurality of adjustment glide tracks, and includes a sliding pin for engaging one of the gear segments within one of the plurality of adjustment glide tracks via one of the locking notches. The transmission also includes a non-rotating control guide for engaging a sliding pin of each of the plurality of gear segments with one of the plurality of adjustment glide tracks and a control cable for movement of the non-rotating control guide by an operator of the bicycle. The operation of the control cable moves the non-rotating control guide backward or forward for engaging a sliding pin of each of the plurality gear segments, moving each of the plurality of gear segments in a direction toward the outer portion of the rigid base plate or toward the central portion of the base plate and changing an effective radius of a curved path formed by the plurality of gear segments.

In one embodiment, there is also a bicycle pedal crank attached to the central portion of the rigid base plate. In another example, non-rotating control guide further comprises an inner plate and an outer plate, the inner plate and outer plate connected to the non-rotating control guide and is adapted so that the inner plate urges the sliding pin of each of the plurality of gear segments toward the outer portion of the base plate and the outer plate urges the sliding pin of each of the plurality of gear segments toward the central portion of the base plate. In one embodiment, the inner plate and outer plate are spaced apart and are mounted on the non-rotating control guide. In some embodiments where the control guide comprises an inner plate and an outer plate, the inner plate and outer plates comprise a first inner arc and a second outer arc, the first inner arc having a greater radius of curvature than the second outer arc. In some embodiments, each adjustment glide track comprises a central hollow portion contiguous with the at least two locking notches.

In one embodiment, the plurality of adjustment glide tracks comprises at least two adjustment glide tracks, the at least two adjustment glide tracks joining the central portion of the rigid base plate to the outer periphery of the rigid base plate. In one embodiment, the rigid base plate comprises a wheel of a bicycle and further comprising a bicycle frame attached to the central portion of the rigid base plate, a front wheel of the bicycle attached to the bicycle frame and a bicycle chain engaging the plurality of gear segments. In one embodiment, each of the plurality of gear segments further comprises an internal spring for urging the pin into one of the locking notches. In one embodiment, the internal spring for each gear segment further comprises a mount for the spring on one side of the spring with the sliding pin mounted on a second side of the spring.

One embodiment is a transmission, the transmission suitable for a device such as a bicycle. The transmission includes a wheel, a wheel, a plurality of spokes attached between a periphery of the wheel and a central portion of the wheel, each of the plurality of spokes including at least two locking notches, and a plurality of gear segments. Each one of the plurality of gear segments has a plurality of teeth, is attached to one of the plurality of spokes to allow each one of the plurality of gear segments to slide radially inward and outward along the one of the plurality of spokes, and includes a sliding pin for engaging the one of the plurality of spokes via one of the at least two locking notches. The transmission also includes a control guide for engaging a sliding pin of each of the plurality of gear segments and a control mechanism for movement of the control guide. The operation of the control mechanism moves the control guide backward or forward for engaging a sliding pin of each of the plurality of gear segments, moving each of the plurality of gear segments in a direction toward the periphery of the wheel or toward the central portion of the wheel, and changing an effective radius of a curved path formed by the plurality of gear segments.

In one embodiment, the at least two locking notches are spaced between the outer periphery of and the central portion of the wheel. In one embodiment, the control mechanism comprises a control cable accessible by an operator of the bicycle. In one embodiment, the control mechanism comprises a motor and an actuator connected to the control guide. In some embodiments, such as those with a motor and an actuator, the transmission may also include a microprocessor and radio receiver operably connected to the motor. In some of these embodiments, the transmission also includes a power supply connected to the motor.

In embodiments, the plurality of arc segments having a plurality of teeth is adapted for engaging a chain drive or a belt. In some embodiments, the control guide is adapted for mounting on a frame of a bicycle. In some embodiments, the control guide further comprises an inner plate and an outer plate, the inner plate and outer plate connected to the control guide and adapted so that the inner plate urges the sliding pin of each of the plurality of gear segments toward the outer portion of the base plate and the outer plate urges the sliding pin of each of the plurality of gear segments toward the central portion of the base plate. In some embodiments, the transmission also includes the frame of the bicycle.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. A transmission for a bicycle, comprising:
   (a) a rigid base plate for rotating about a central axis of rotation;
   (b) a plurality of adjustment glide tracks attached between an outer portion of the rigid base plate and a central portion of the rigid base plate, each of the plurality of adjustment glide tracks comprising at least two locking notches;
   (c) a plurality of gear segments, each one of the plurality of gear segments having a plurality of teeth for engaging a drive chain, each of the plurality of gear segments being attached to said rigid base plate to allow said plurality of gear segments to slide radially inward and outward along one of the plurality of adjustment glide tracks, and each one of the plurality of gear segments comprising a sliding pin for engaging the one of the plurality of adjustment glide tracks via one of the locking notches;
   (d) a non-rotating control guide for engaging a sliding pin of each of the plurality of gear segments with one of the plurality of adjustment glide tracks, the non-rotating control guide comprising an inner plate and an outer plate, the inner plate and outer plate non-pivotably connected to the non-rotating control guide and adapted so that the inner plate urges the sliding pin of each of the plurality of gear segments toward the outer portion of the base plate and the outer plate urges the sliding pin of each of the plurality of gear segments toward the central portion of the base plate; and
   (e) a control cable for movement of the non-rotating control guide by an operator of the bicycle,
   wherein operation of the control cable moves the non-rotating control guide backward or forward for engaging a sliding pin of each of the plurality gear segments, moving each of the plurality of gear segments in a direction toward the outer portion of the rigid base plate or toward the central portion of the base plate and changing an effective radius of a curved path formed by the plurality of gear segments.

2. The transmission of claim 1, further comprising a bicycle pedal crank attached to the central portion of the rigid base plate.

3. The transmission of claim 1, wherein the inner plate and outer plate are spaced apart and are mounted on the non-rotating control guide.

4. The transmission of claim 1, wherein the inner plate and outer plates comprise a first inner arc and a second outer arc, the first arc having a greater radius of curvature than the second outer arc.

5. The transmission of claim 1, wherein each adjustment glide track comprises a central hollow portion contiguous with the at least two locking notches.

6. The transmission of claim 1, wherein the plurality of adjustment glide tracks comprises two adjustment glide tracks, the two adjustment glide tracks joining the central portion of the rigid base plate to the outer periphery of the rigid base plate.

7. The transmission of claim 1, wherein the rigid base plate comprises a wheel of a bicycle and further comprising a bicycle frame attached to the central portion of the rigid base plate, a front wheel of the bicycle attached to the bicycle frame and a bicycle chain engaging the plurality of gear segments.

8. The transmission of claim 1, wherein each of the plurality of gear segments further comprises an internal spring for urging the pin into one of the locking notches.

9. The transmission of claim 1, wherein the internal spring for each gear segment further comprises a mount for the spring on one side of the spring with the sliding pin mounted on a second side of the spring.

10. A transmission, comprising:
   (a) a wheel;
   (b) a plurality of spokes attached between a periphery of the wheel and a central portion of the wheel, each of the plurality of spokes comprising at least two locking notches;
   (c) a plurality of gear segments, each one of the plurality of gear segments having a plurality of teeth, each one of the plurality of gear segments being attached to one of the plurality of spokes to allow each one of the plurality of gear segments to slide radially inward and outward along the one of the plurality of spokes, and each one of the plurality of gear segments comprising a sliding pin for engaging the one of the plurality of spokes via one of the at least two locking notches;
   (d) a control guide for engaging a sliding pin of each of the plurality of gear segments, the control guide comprising an inner plate and an outer plate, the inner plate and outer plate non-pivotably connected to the control guide and adapted so that the inner plate urges the sliding pin of each of the plurality of gear segments radially outward along the one of the plurality of spokes and the outer plate urges the sliding pin of each of the plurality of gear segments radially inward along the one of the plurality of spokes; and
   (e) a control mechanism for movement of the control guide,
   wherein operation of the control mechanism moves the control guide backward or forward for engaging a sliding pin of each of the plurality of gear segments, moving each of the plurality of gear segments in a direction toward the periphery of the wheel or toward the central portion of the wheel, and changing an effective radius of a curved path formed by the plurality of gear segments.

11. The transmission of claim 10, wherein the at least two locking notches are spaced between the outer periphery of and the central portion of the wheel.

12. The transmission of claim 10, wherein the control mechanism comprises a control cable accessible by an operator of the bicycle.

13. The transmission of claim 10, wherein the control mechanism comprises a motor and an actuator connected to the control guide.

14. The transmission of claim 13, further comprising a microprocessor and radio receiver operably connected to the motor.

15. The transmission of claim 13, further comprising a power supply connected to the motor.

16. The transmission of claim 10, wherein the plurality of arc segments having a plurality of teeth are adapted for engaging a chain drive or a belt.

17. The transmission of claim 10, wherein the control guide is adapted for mounting on a frame of a bicycle.

18. The transmission of claim 17, further comprising the frame of the bicycle.

* * * * *